United States Patent [19]
Olivieri

[11] Patent Number: 5,573,257
[45] Date of Patent: Nov. 12, 1996

[54] FLEXIBLE RUNNER SLED

[76] Inventor: Benson H. Olivieri, 6420 Holliday Way, Post Falls, Id. 83854

[21] Appl. No.: 364,132

[22] Filed: Dec. 27, 1994

[51] Int. Cl.[6] .............................. B62B 13/06; B62B 13/12
[52] U.S. Cl. ...................... 280/22; 280/21.1; 280/28.11; 188/8
[58] Field of Search .......................... 280/21.1, 22, 22.1, 280/28.11, 845; 188/8

[56] References Cited

U.S. PATENT DOCUMENTS

| | | | |
|---|---|---|---|
| 175,824 | 4/1876 | Crossman | 188/8 |
| 310,078 | 12/1884 | Peterson | 280/22 |
| 1,256,417 | 2/1918 | Woods | 280/22 |
| 1,298,355 | 3/1919 | Knudsen . | |
| 2,006,328 | 6/1935 | Scholtes . | |
| 2,019,958 | 11/1935 | Fluegel . | |
| 2,199,680 | 5/1940 | Sherwood . | |
| 2,247,033 | 6/1941 | Oermann et al. . | |
| 2,292,130 | 8/1942 | Krauss | 280/22 |
| 2,568,070 | 9/1951 | Holbrook | 280/22 |
| 2,597,101 | 5/1952 | Jasper | 280/21.1 |
| 3,329,440 | 7/1967 | Tonelli | 280/22.1 |
| 3,777,831 | 12/1973 | Hale | 280/21.1 |
| 4,036,506 | 7/1977 | Scheib | 280/22.1 |
| 4,175,759 | 11/1979 | Strunk | 280/22.1 |
| 4,466,627 | 8/1984 | Gottlieb | 280/28.11 |
| 4,530,509 | 7/1985 | Maxwell, Jr. | 280/22 |

Primary Examiner—Brian L. Johnson
Assistant Examiner—Min Yu
Attorney, Agent, or Firm—Wells, St. John, Roberts, Gregory & Matkin P.S.

[57] ABSTRACT

A coaster having a pair of longitudinally-extending and laterally-spaced flexible sled runners which support and define a path for the coaster along a ground surface. The coaster includes forward, intermediate, and rearward lateral struts extending between the flexible runners. The flexible sled runners extend forward from the forward lateral strut to leading rail ends. A longitudinally-extending body support board is mounted above the runners in such a manner as to-allow it to pivot or tilt, relative to the flexible sled runners, about a longitudinal axis. A steering handle is operably connected to the leading rail ends to laterally displace the leading rail ends and to thereby arc the flexible sled runners. Interlinkage between the steering handle and the body support board pivots the body support board in response to turning the steering handle. Gearing associated with the body support board and the intermediate lateral strut laterally displaces the intermediate lateral strut relative to the forward and rearward lateral struts in response to pivoting the body support board relative to the flexible sled runners. This displacement further arcs the flexible sled runners and thereby curves the path of the coaster.

27 Claims, 10 Drawing Sheets

FLEXIBLE RUNNER SLED

TECHNICAL FIELD

This invention relates to flexible rail coasters and coaster sleds.

BACKGROUND OF THE INVENTION

Coaster sleds have been popular for many years. The most popular form of such sleds comprises a pair of longitudinally-extending and laterally-spaced runners, connected to each other by two or more lateral struts. Slats extend longitudinally over the struts between the runners for supporting a rider in either a prone or sitting position. The runners have front ends which bow upwardly. A lateral steering handle is operatively connected to the front ends of the runners. The steering handle can be turned to arc the runners and to thereby curve the path of the sled. In most embodiments of such sleds, the steering handle is mounted to a steering link which extends longitudinally from the front end of a center rider support slat to a forward cross-piece between the front ends of the respective runners. Turning the steering handle turns the steering link and thereby laterally displaces the cross-piece and the connected front ends of the runners. This produces an arc along forward portions of the runners, thereby curving the path of the sled.

In most sleds of this design, the mounting of the slats to the struts is such that it allows the runners to arc along their entire lengths. The overall design is intended to produce an arc along the entire lengths of the runners when the steering handle is turned. In spite of this, it is often very difficult to make sharp turns with a coaster sled of this design. This is at least partially due to the fact that displacing force is applied when turning the steering handle only at the extreme front ends of the sled runners.

The prior art includes variations of the designs described above. Refer, for instance, to U.S. Pat. No. 1,298,355 to Knudsen, dated Mar. 25, 1919. The Knudsen patent discloses a runner sled similar in design to that described above except for the steering mechanism. Rather than displacing the front ends of the runners, cables run from a steering wheel to an intermediate portion of the runners. Turning the steering wheel produces a lateral displacement of an intermediate portion of the runners.

Even if this prior art design or another prior art design could be utilized to achieve greater arcing of sled runners, lateral stability would likely remain as a problem. Sharp cornering tends to shift a rider's weight to the outside and to either tip the sled over to throw the rider from the sled. Riders often lean over the inside edge of a sled to counteract this tendency, even though this frequently results in dragging arms or legs.

The invention described below greatly improves the cornering characteristics of flexible rail coasters or sleds, and also increases the speed which can be attained with such vehicles. This is accomplished while retaining, for the most part, the traditional construction and characteristics of flexible runner vehicles.

BRIEF DESCRIPTION OF THE DRAWINGS

FIG. 4 is a side view of the coaster shown in FIG. 1.

FIG. 13 is a bottom view similar to that of FIG. 3 except that braking components have been removed for clarity and the coaster is shown with its components positioned for cornering around a left-hand corner.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

FIGS. 1–4 show various overall views of a flexible-rail coaster 20 in accordance with a preferred embodiment of the invention. In the preferred embodiment, coaster 20 is a snow sled, having runners or blades for ground support. Roller-type flexible-rail coasters could also be embodied in accordance with the invention. In this case, parallel flexible rails would be equipped with inline rollers for coasting or rolling over bare or paved inclines.

Coaster 20 includes a pair of longitudinally-extending and laterally-spaced flexible rails 22 which support and define a path or course for the coaster along a ground surface. In the preferred embodiment discussed herein, the rails are sled runners which are maintained in parallel relationship. The path of the sled as it coasts down a slope is generally determined by the line of the parallel runners. Arcing the runners in one direction will turn the sled to the left. Arcing the runners in another direction will turn the sled to the right.

Figure 9:
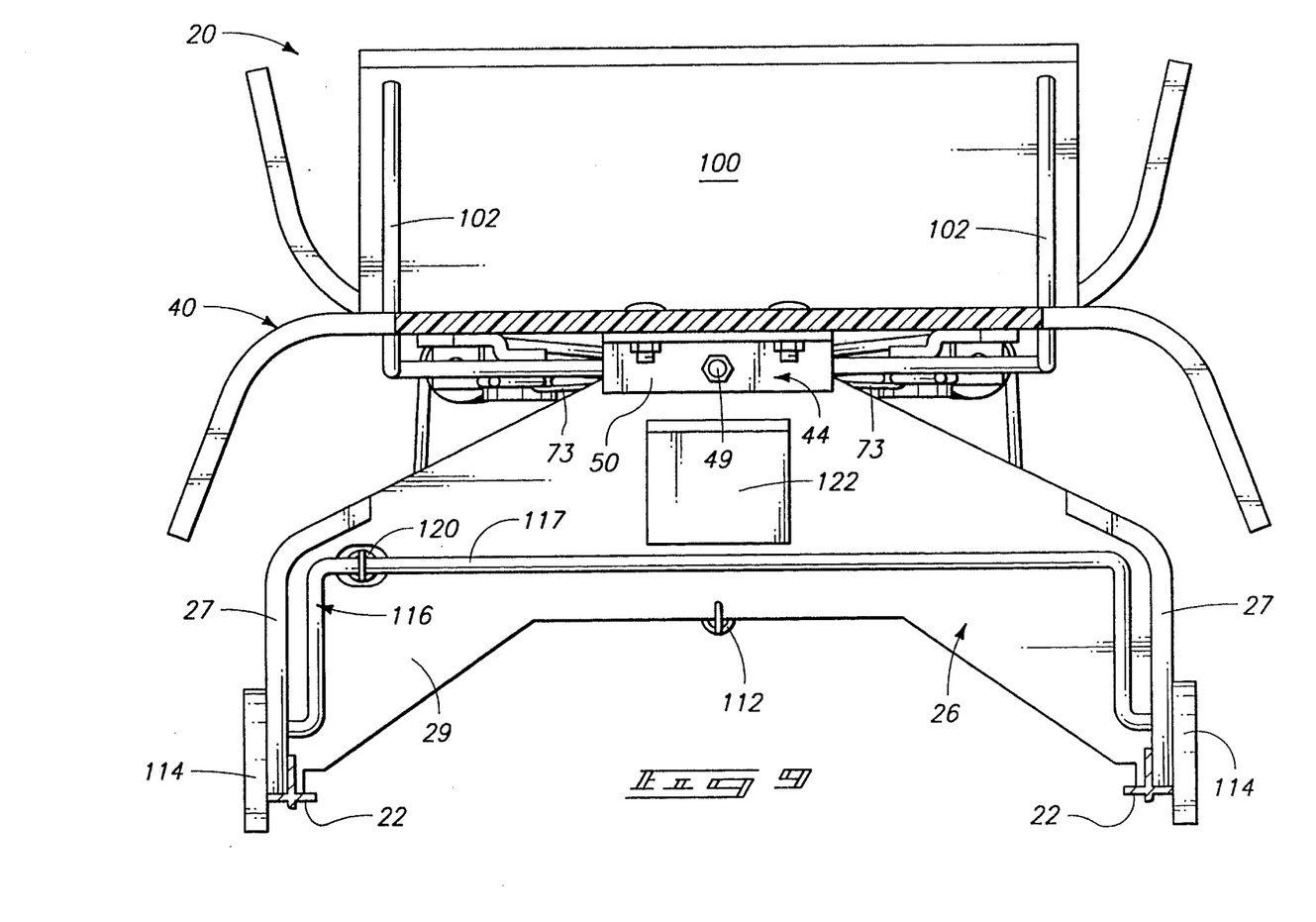
FIG. 9 is a sectional view taken along the line 9—9 of FIG. 5.

The flexible rails are supported relative to each other by a set of lateral struts. Specifically, coaster 20 includes a rearward lateral strut 24, a forward lateral strut 26, and an intermediate lateral strut 28 in between rearward and forward lateral struts 24 and 26. Each strut extends laterally between parallel rails 22. Struts 24, 26, and 28 are seen most clearly in the bottom view of FIG. 3, although they are also visible in FIGS. 1 and 4. Each strut comprises a pair of generally triangular gussets 27 (FIGS. 1 and 4) connected to respective rails 22 at corresponding longitudinal positions. The gussets have inside edges which face each other. As shown in FIG. 9, which shows forward lateral strut 26, each strut further comprises a lateral plate 29 which extends between gussets 27. Lateral plate 29 in the preferred embodiment is peaked toward its lateral center, and has outside edges which intersect and are appropriately fastened to the inside edges of gussets 27.

Figure 1:
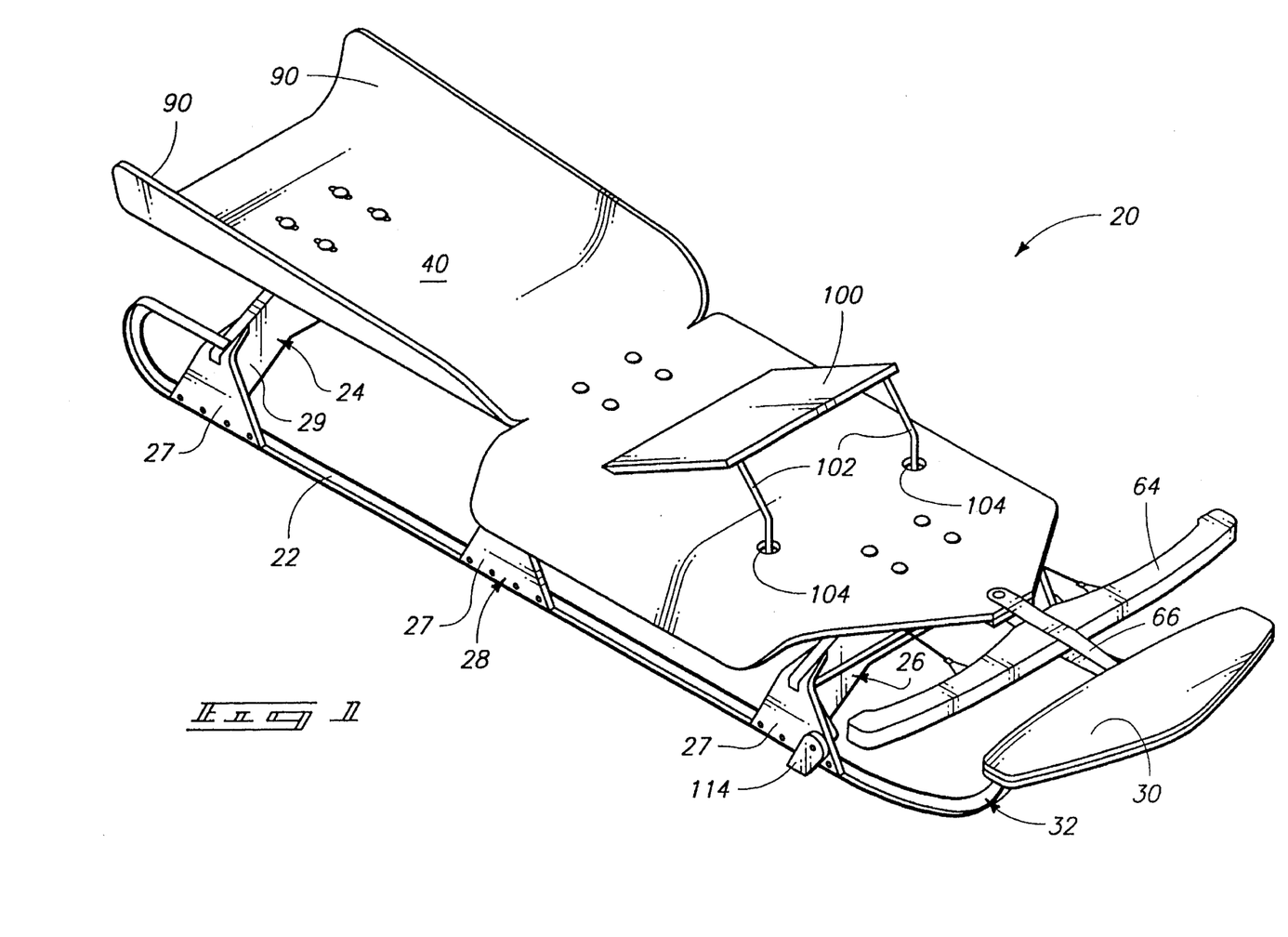
FIG. 1 is a front perspective view of a coaster in accordance with a preferred embodiment of the invention.
Figure 2:
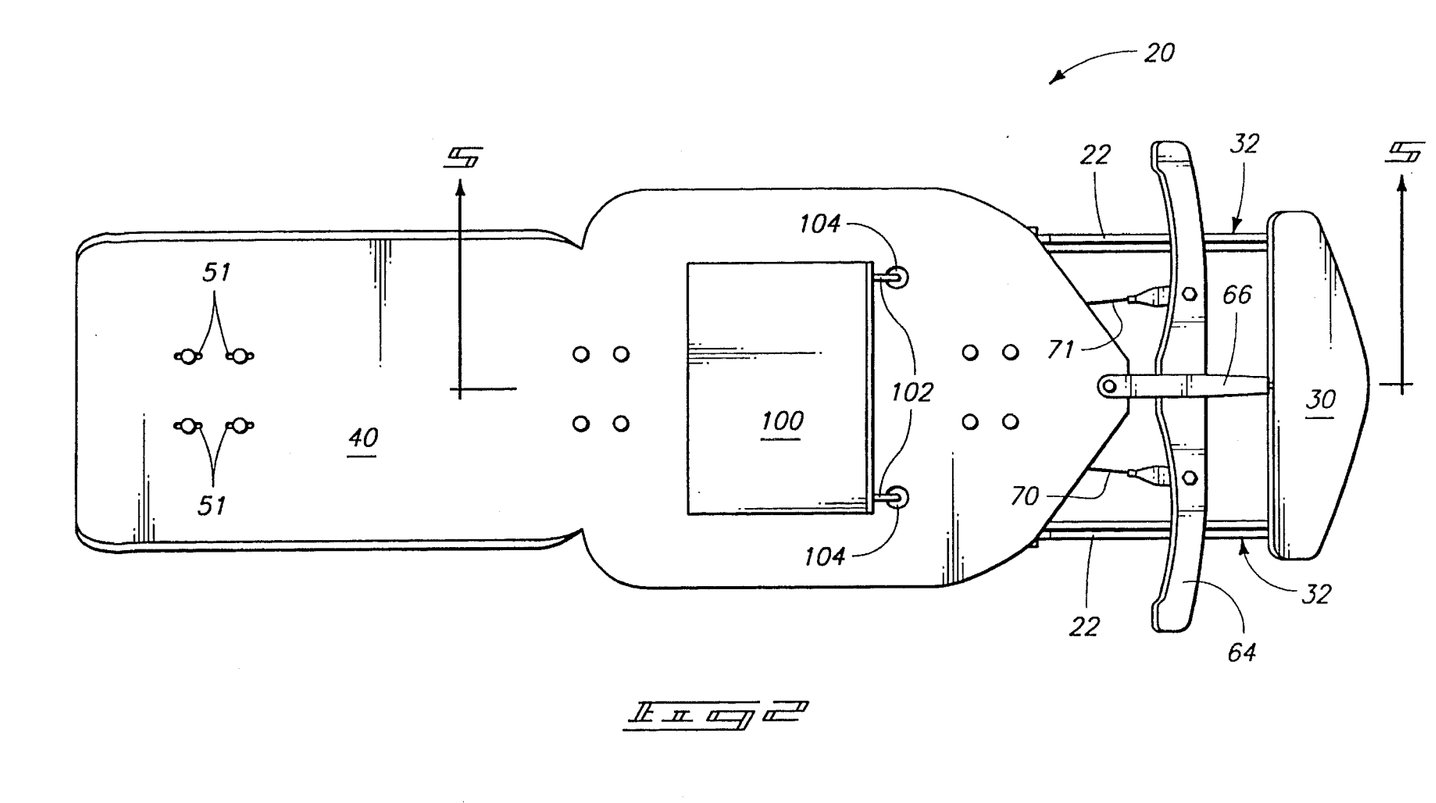
FIG. 2 is a top view of the coaster shown in FIG. 1.
Figure 3:
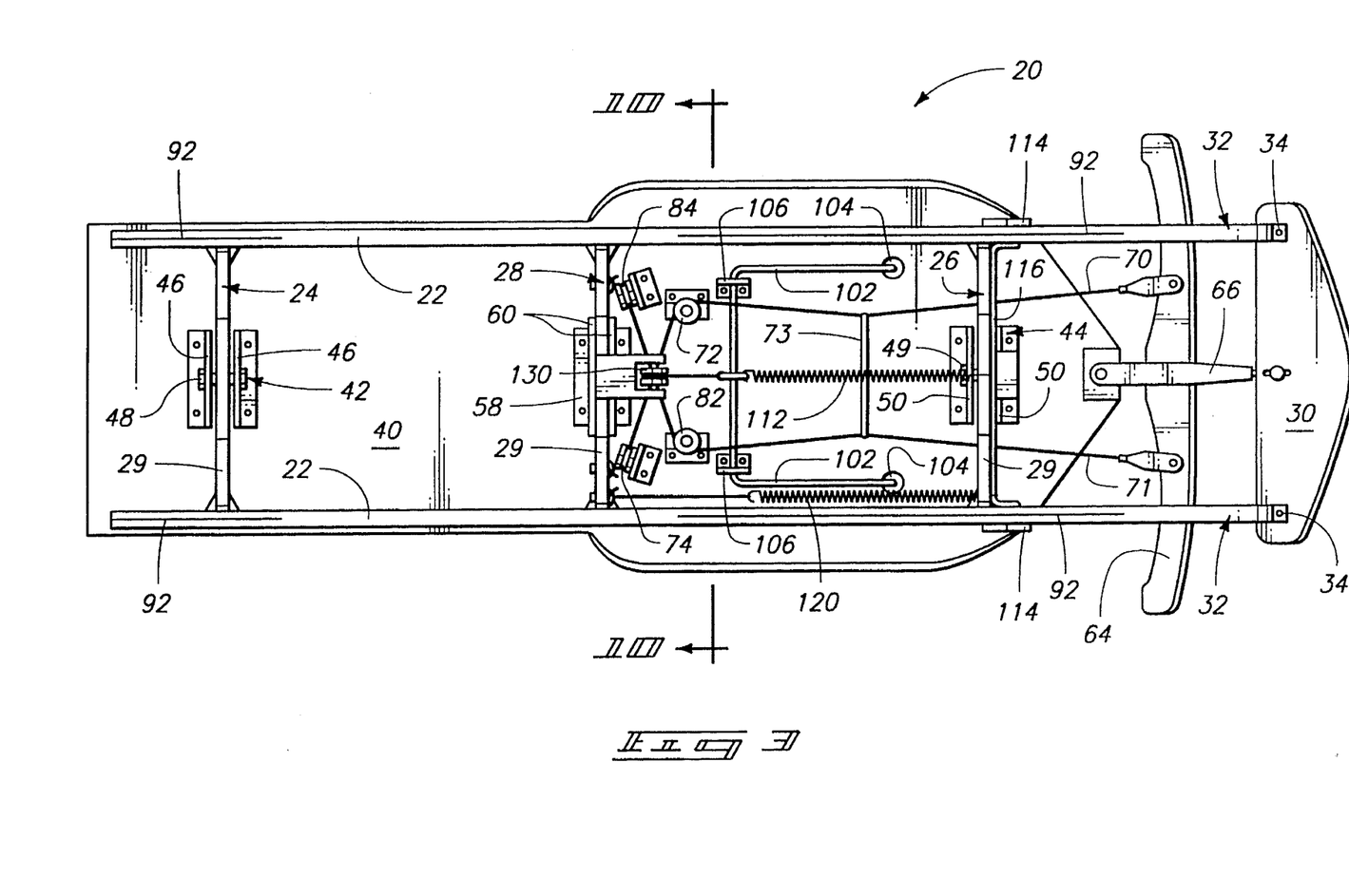
FIG. 3 is a bottom view of the coaster shown in FIG. 1.

The flexible sled runners 22 extend longitudinally forward from forward lateral strut 26 to leading rail ends 32. A front cross-piece 30 extends laterally between runners 22 at their leading rail ends 32. Cross-piece 30 is connected to leading ends 32 by pivoting joints 34 (FIG. 3). Flexible sled runners 22, lateral struts 24, 26, and 28, and cross-piece 30 form a runner sub-assembly.

Coaster 20 includes a longitudinally-extending body support board 40 which is mounted over and along flexible runners 22. Body support board 40 has upper surfaces for supporting a rider in a prone position. Additional details of body support board 40 will be described in more detail below.

Body support board 40 is mounted over the runner sub-assembly in such a way as to allow pivoting of support board 40, relative to flexible runners 22, about a longitudinal pivot axis which extends parallel to and laterally midway between flexible runners 22. Coaster 20 comprises at least one, and preferably two, pivot joints between the body support board 40 and the lateral struts. More specifically, coaster 20 has a rearward pivot joint 42 and a forward pivot joint 44 (FIGS. 3 and 4). Rearward pivot joint 42 is formed by the peaked lateral plate 29 of rearward lateral strut 24 and a rearward pair of downwardly-extending pivot plates 46. Pivot plates 46 face each other to form a lateral channel therebetween. The peaked portion of rearward strut lateral plate 29 fits between this lateral channel. A pivot shaft or bolt 48 extends longitudinally through the facing pivot plates and through rearward lateral strut lateral plate 29. This forms a pivotal connection between body support board 40 and rearward lateral strut 24.

Forward pivot joint 44 is formed in a similar manner, with a forward pair of downwardly-extending pivot plates 50 in conjunction with forward lateral strut 26 and a pivot shaft or bolt 49.

The individual plates of each pivot plate pair 46 and 50 are spaced longitudinally from each other by a distance which is somewhat greater than the thickness of the received peaked lateral plate 29. Furthermore, the pivot shaft of each pivotal connection is received through a hole in the corresponding peaked lateral plate 29 which is slightly larger than the pivot shaft. This allows a limited degree of twisting of the lateral strut about a vertical axis relative to body support board 40. Furthermore, rearward pivot plates 46 are attached to body support board 40 by bolts through longitudinally-extending slots 51 (FIG. 2) in body support board 40. The slots allow further twisting of rearward lateral strut 24 relative to body support board 40.

Coaster 20 also comprises gearing between the body support board and at least a first of the lateral struts. Such gearing is designed to laterally displace said first lateral strut relative to at least a second of the lateral struts in response to pivoting the body support board relative to the flexible sled runners. More specifically, the gearing is associated with the body support board and with intermediate lateral strut 28 to displace intermediate lateral strut 28 relative to rear and front lateral struts 24 and 26. This produces a lateral displacement of intermediate portions of flexible runners 22 relative to front and rear portions of flexible runners 22, thereby arcing the line of the runners and curving the path of the coaster.

Figure 7:
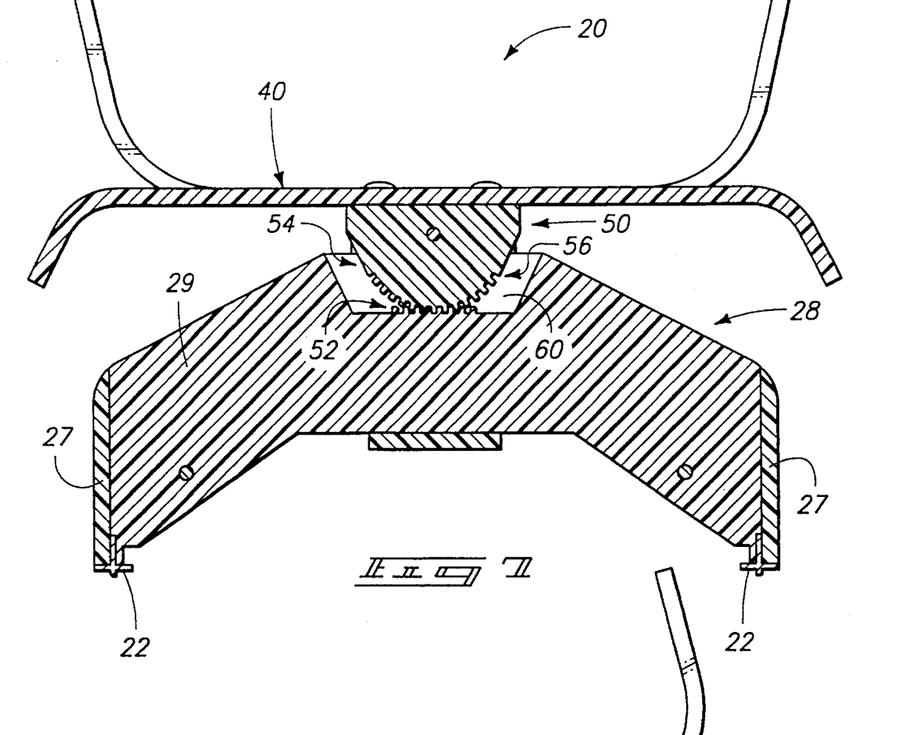
FIG. 7 is a cross-sectional view taken along the line 7—7 of FIG. 4.
Figure 8:
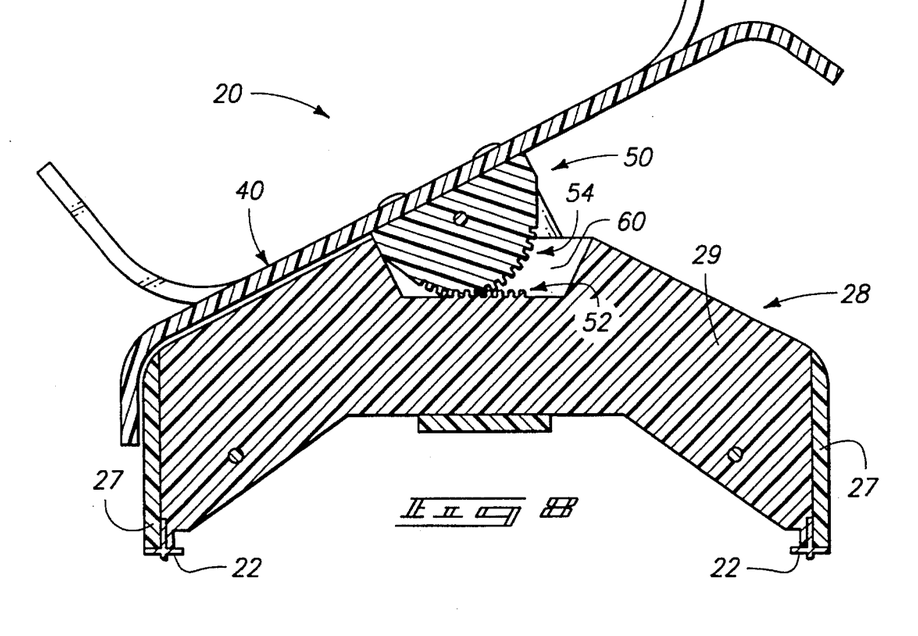
FIG. 8 is a cross-sectional view similar to that of FIG. 7 except that FIG. 8 shows the body support board of the coaster in a tilted position for cornering.

The described mechanism for displacing the intermediate lateral strut in the preferred embodiment is a gearing best shown in FIGS. 7 and 8, referenced by numeral 50. The gearing specifically comprises a toothed gear or linear rack 52 formed on and along the top of lateral plate 29 of intermediate lateral strut 28, extending laterally between intermediate portions of flexible sled runners 22. Pinion gearing 54 extends downward from the body support board 40 to mate with toothed rack 52. An upper cut-out 56 is formed in lateral plate 29, and pinion gearing 54 extends downward into this cut-out. Toothed rack 52 is formed in the bottom of cut-out 56. Pinion gearing 54 comprises a generally semi-circular plate which is mounted with appropriate brackets 58 (FIG. 3) to body support board 40. Gear teeth are formed on the lower, circular edge of this plate to mate with toothed rack 52. Retaining plates 60 (FIGS. 3 and 10) are positioned on opposite longitudinal sides of lateral plate 29 to surround pinion gearing 54 and to retain it longitudinally within cut-out 56. It may be desirable, in addition, to provide vertical restraining means between intermediate strut 28 and pinion gearing 54, to ensure positive and constant engagement between toothed rack 52 and pinion gearing 54. Such vertical restraining means might comprise an elastic or spring member (not shown) between intermediate strut 28 and pinion gearing 54. Alternatively, a solid bracket with lateral mounting slots would extend between intermediate strut 28 and pinion gearing 54. The mounting slots would necessarily be oriented to prevent relative vertical movement of the components while allowing free lateral movement.

Pivoting body support board 40 about its longitudinal axis rotates pinion gearing 54. As shown in FIGS. 8 and 13, this rotation laterally displaces toothed rack 52 and intermediate lateral strut 28, along with an associated segment of flexible sled runners 22, thereby curving the line of runners 22.

Coaster 20 includes a steering handle or bar 64 which is similar in appearance and somewhat similar in operation to steering handles of more conventional coaster sleds. It comprises a cross-wise handle with grips on its lateral ends, operably connected to leading ends 32 of flexible runners 22. Steering handle 64 is turnable about a generally vertical axis to laterally displace leading ends 32 and to thereby arc at least the front portions of flexible runners 22.

Steering handle 64 is mounted at an intermediate position along a rigid steering link 66 which extends between the front end of body support board 40 and the lateral center of front cross-piece 30. Steering link 66 is pivotally mounted at both of its ends. Turning steering handle 64 relative to body support board 40 causes steering link 66 to pivot about it rearward end, and to produce a lateral displacement of front cross-piece 30. This, in turn, laterally displaces leading ends 32 of runners 22 and thereby produces an arc in at least the front portions of runners 22 much like a more conventional flexible runner sled. This arc produces a corresponding curve in the course or path of a traveling coaster.

Coaster 20 furthermore includes interlinkage between steering handle 64 and body support board 40 to pivot the body support board (and to thereby arc the intermediate portions of flexible runners 22) in response to turning the steering handle. Such interlinkage preferably comprises cabling operably connected between the steering handle and the pair of flexible sled runners. The cabling is preferably also coupled to the body support board through one or more pulleys.

Figure 5:
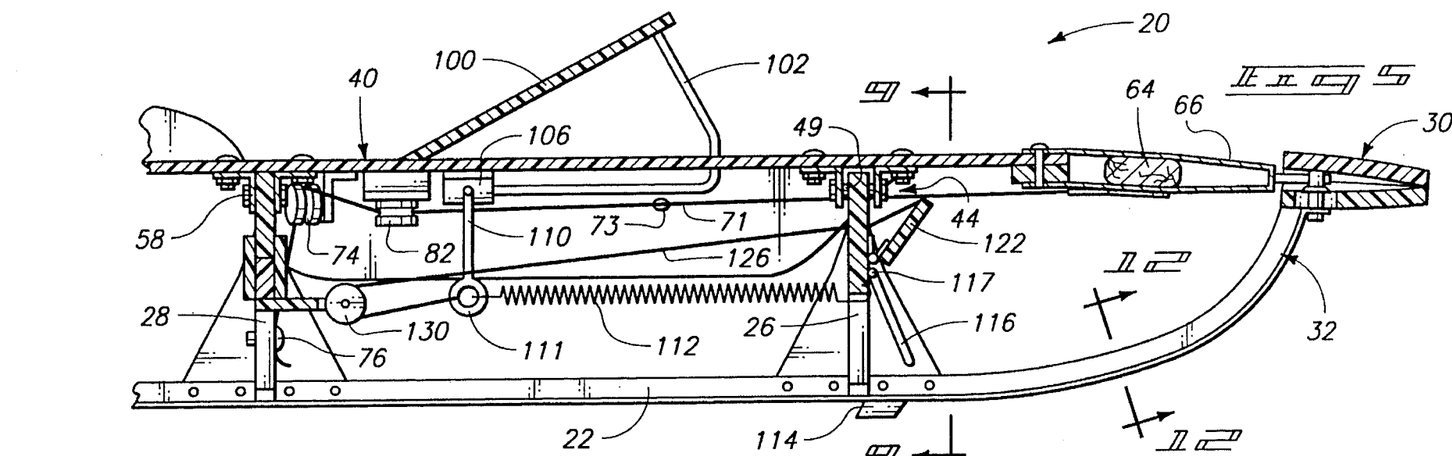
FIG. 5 is an enlarged side view of a front portion of the coaster shown in FIG. 1.
Figure 10:
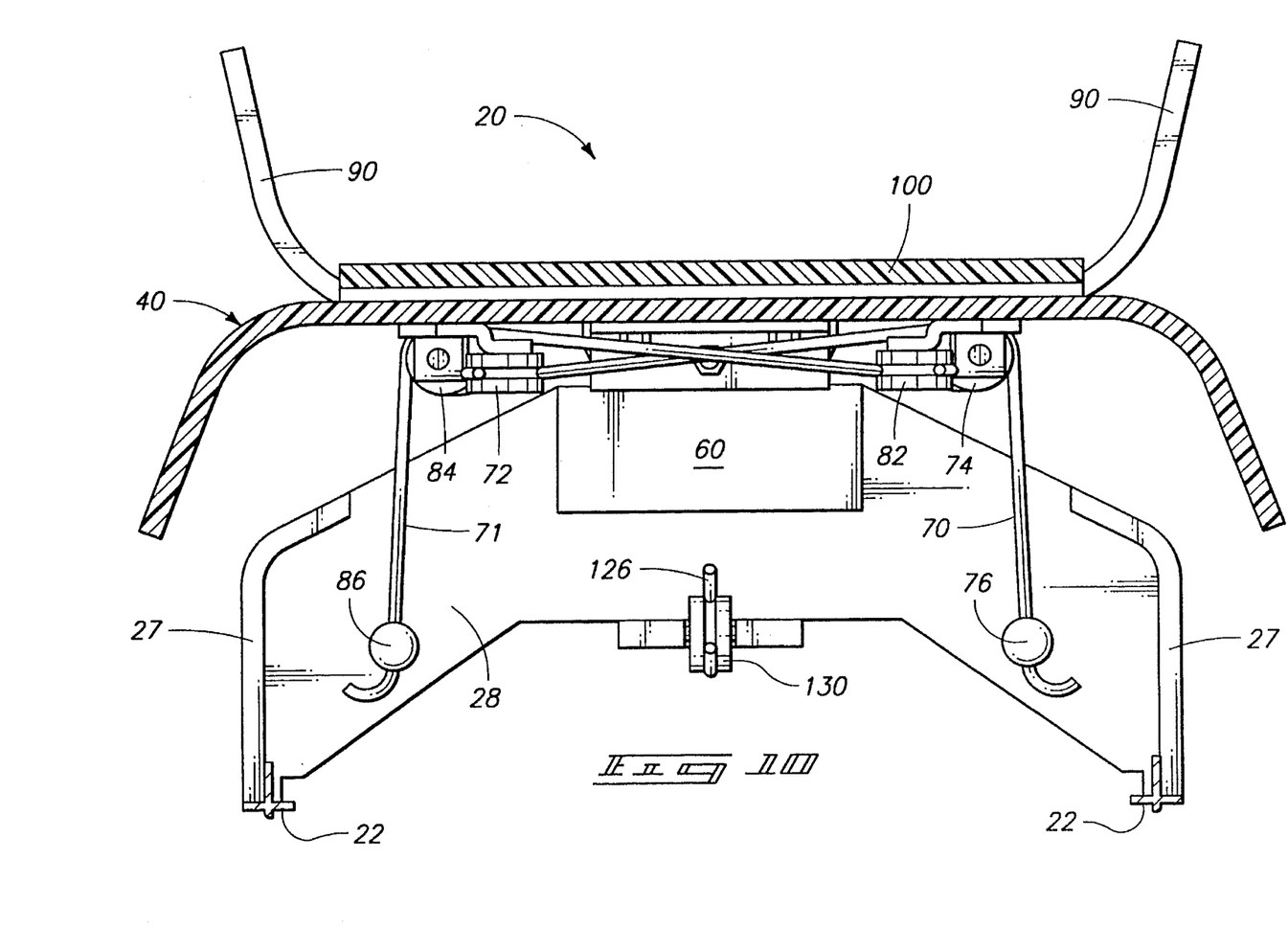
FIG. 10 is a cross-sectional view taken along the line 10—10 of FIG. 3.

The interlinkage between steering handle 64 and body support board 40 is best shown in FIGS. 3, 5, and 10. It is formed primarily by a pair of cables 70 and 71 which extend from steering handle 64, beneath body support board 40, to intermediate lateral strut 28. Each cable is pivotally connected at its forward end to steering handle 64 at a position between the center of the steering handle and its end. The respective cables are connected at opposite first and second sides of the steering handle. Cable 70 is connected on the first or right-hand side of steering handle 64, and cable 71 is connected on the second or left-hand side of steering handle 64.

Cable 70 extends rearwardly from steering handle 64 to a first horizontal redirection pulley 72. First horizontal redirection pulley 72 is mounted beneath body support board 40 forward of and generally adjacent intermediate lateral strut 28, for rotation about a generally vertical axis. It is mounted beneath body support board 40 on the first side of coaster 20, at a lateral position corresponding roughly to the connection of cable 70 to steering handle 64. Cable 70 passes around the outside of pulley 72, and continues inward and across the coaster toward a first vertical redirection pulley 74. First vertical redirection pulley 74 is also mounted beneath body support board 40. However, it is mounted on the second side of coaster 20, on the opposite side from the connection of cable 70 to steering handle 64. First vertical redirection pulley is mounted forward of and closely adjacent intermediate lateral strut 28, for rotation about a generally horizontal axis.

Cable 70 extends slightly rearward from first horizontal redirection pulley 72 to first vertical redirection pulley 74. The rotational axis of first vertical redirection pulley 74 is angled from the longitudinal direction of coaster 20 to accommodate the angle of this portion of cable 70. Cable 70 extends around the top of first vertical redirection pulley 74 and then downward (FIG. 10). Cable 70 is then fixedly connected to a lower portion of intermediate lateral strut 28, on the second side of coaster 20, with a bolt 76 or other suitable means. Cable 70 extends generally vertically from first vertical redirection pulley 74 to the termination of cable 70 on the forward side of lateral plate 29 of intermediate lateral strut 28.

Cable 71 is mounted and guided similarly to cable 70. It extends rearwardly from steering handle 64 to a second horizontal redirection pulley 82. Second horizontal redirection pulley 82 is mounted beneath body support board 40 forward of and generally adjacent intermediate lateral strut 28, for rotation about a generally vertical axis. It is mounted beneath body support board 40 on the second side of coaster 20, at a lateral position corresponding roughly to the connection of cable 71 to steering handle 64. Cable 71 passes around the outside of pulley 82, and continues inward and across the coaster toward a second vertical redirection pulley 84. Second vertical redirection pulley 84 is also mounted beneath body support board 40. However, it is mounted on the first side of coaster 20, on the opposite side from the connection of cable 71 to steering handle 64. Second vertical redirection pulley 84 is mounted forward of and closely adjacent intermediate lateral strut 28, for rotation about a horizontal axis.

Cable 71 extends slightly rearward from second horizontal redirection pulley 82 to second vertical redirection pulley 84. The rotational axis of second vertical redirection pulley 84 is angled from the longitudinal direction of coaster 20 to accommodate the angle of this portion of cable 71. Cable 71 extends around the top of second vertical redirection pulley 84 and then downward. Cable 71 is then fixedly connected to a lower portion of intermediate lateral strut 28, on the first side of coaster 20, with a bolt 86 or other suitable means. Cable 71 extends generally vertically from second vertical redirection pulley 84 to the termination of cable 71 on the forward side of lateral plate 29 of intermediate lateral strut 28.

Cables 70 and 71 are kept taut by provision of a cable tensioner 73 (FIG. 3). The tensioner is advantageously formed of an elastic loop, of a material such as surgical tubing, stretched around the two cables. The flexible tensioner 73 will move or flex with the cables while maintaining tension.

With this configuration, turning steering handle 64 in a right-hand or clockwise direction (as the coaster is viewed from above) pulls cable 71 toward the front of the coaster. This, in turn, pulls second vertical redirection pulley 84 toward the termination of cable 71 at bolt 86. Since second vertical redirection pulley 84 is fixed to the right-hand side of body support board 40, this pivots or tilts body support board 40 toward the right-hand side of coaster 20. Likewise, turning steering handle 64 in a left-hand or counterclockwise direction pulls cable 70 toward the front of the coaster. This pulls first vertical redirection pulley 74 toward the termination of cable 70 at bolt 76. Since first vertical redirection pulley 74 is fixed to the left-hand side of body support board 40, this pivots body support board 40 toward the left-hand side of coaster 20.

In operation by a rider, a left-hand turn is accomplished by turning the steering handle to the left. This also tilts or leans the body support board and the rider toward the left or inside of the corner, while producing a dramatic curvature of the flexible runners along nearly their entire length as shown in FIG. 13. The great degree of curvature is the result of left-hand lateral displacement of the fronts of the flexible runners in conjunction with right-hand displacement (produced by the gearing described above) of intermediate portions of the flexible runners. A right-hand turn is similarly accomplished by turning the steering handle to the right.

This coordination of the steering handle with the pivotable body support board automatically reduces the tendency for a rider's weight to shift to the outside of the coaster when cornering. The gearing mechanism furthermore results in tighter runner arcing and turning radii than have previously been possible. Together, these features make it possible to achieve much greater maneuverability and speed than can be achieved with other types of coasters.

The coordination of steering handle 64 with gearing 50 can be adjusted or calibrated by adjusting the lateral position of the connection of cables 70 and 71 to steering handle 64. Moving the connection points outwardly produces increased arcing of intermediate portions of the runners relative to front portions of the runners. Moving the connection points inwardly produces increased arcing of front portions of the runners relative to intermediate portions of the runners.

Body support board 40 has a further feature of being shaped to help hold a rider on the support board when cornering coaster 20. Specifically, support board 40 has upwardly extending walls 90 (FIGS. 1 and 10) along at least rearward portions of its lateral edges. To form these walls, support board 40 is preferably formed of a rigid sheet of plastic material which can be easily bent or molded upon the application of heat. Walls 90 are formed by simply heating the plastic material along the desired bend line, and then bending the edges upward as desired. The walls 90 hold a rider on the body board while allowing the rider to center his or her lower body weight on the rearward portion of the body board. This may be done by the rider spreading and bracing his or her knees against the upwardly extending walls 90.

The front portions of the lateral edges of support board 40 are preferably not bent upwardly. Instead in a preferred form, the front portions are bent downwardly, primarily to allow room for a rider's arms as they reach along the sides of the coaster toward steering handle 64. This allows the rider to grip the board between his or her arms and to center his or her forward body weight on the forward portion of the body board. Such centering is with respect to the longitudinal pivot axis. It is desirable to bend the forward edges of support 40 downward to present a smooth surface for a rider's arms to clamp against.

Figure 12:
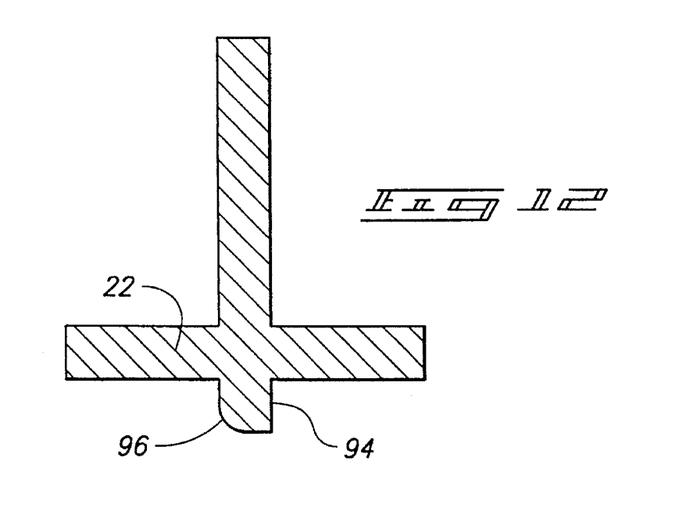
FIG. 12 is a cross-sectional view of a runner in accordance with the invention, taken along the line 12—12 of FIG. 5.

The centered weight of the rider over the pivot axis makes it possible to turn the coaster with ease. Cornering is further enhanced by including a plurality of blades or blade segments 92 which extend downwardly from lengths of the flexible sled runners. Two such blades are preferably used on each runner: one toward the front of the runner and one toward the rear of the runner. As shown in FIG. 12, these blades preferably have inner edges 94, facing the inside of coaster 20, which are sharpened. Blades 92 have outer edges 96, facing the outside of coaster 20, which are rounded or dull. It has been found that this prevents the outside blade during cornering from catching and flipping the coaster. Rather, the tilting body support board shifts much of a rider's weight toward the inside blade. The sharpened edge of the inside blade bears most of the cornering forces, while the rounded edge of the outside blade allows it to more easily slide laterally over bumps and obstacles without grabbing. If the coaster is of a type which utilizes wheels, such wheels are similarly shaped, with sharp inside edges and rounded or dull outside edges.

In addition to the features described above, coaster 20 includes a safety release which is depressed or otherwise operated by a rider's weight when a rider rests on the body support board. Coaster 20 furthermore includes at least one braking element operatively connected to the safety release to extend downwardly beyond the flexible sled runners to brake the sled when the safety release is not depressed.

As best shown in FIGS. 3 and 5, the safety release is formed by a flat panel 100 (FIG. 5) which is normally inclined upwardly atop body support board 40 from rear to front. Flat panel 100 is supported by two support rods 102 which extend generally vertically through corresponding holes 104 in support board 40 and which are attached to the forward and upward portion of flat panel 100. Support rods 102 extend generally downward from the front portion of flat panel 100, through holes 104, and then rearwardly beneath body support board 40. Two pivot brackets 106 are attached beneath body support board 40. These brackets have laterally-extending holes for rotatably receiving rods 102. Rods 102 are bent inwardly to extend through the laterally-extending holes of brackets 106. The rods meet and are connected to each other between brackets 106. In the preferred embodiment, the rods are formed of a single steel rod which is appropriately bent in the shape described above.

A lever 110 extends downwardly from the intersection of rods 102 between brackets 106. Lever 110 is attached to rods 102 so that it rotates rearwardly when flat panel 100 is depressed by a rider's body weight. Lever 110 has a loop or eyelet 111 at its lower end. A coiled spring or other elastic member 112 extends between front lateral strut 26 and the loop of lever 110 to bias flat panel 100 upwardly.

An automatic braking mechanism is formed by a pair of braking elements or pivoting studs 114 located on the outside and forward portion of each flexible runner 22. As shown in FIG. 9, studs 114 are mounted on a bar 116 which extends laterally on each side of coaster 20 through gussets 27 of forward lateral strut 26. From the immediate insides of gussets 27, bar 116 extends upwardly and then laterally across and beneath body support board 40, forming an upper lateral portion 117.

Figure 6:
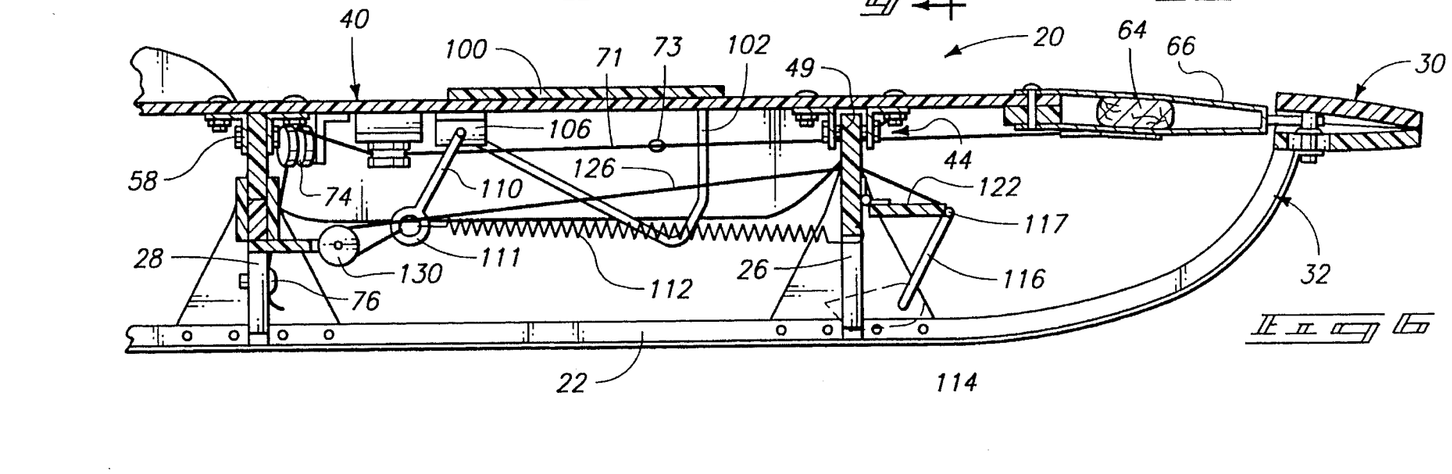
FIG. 6 is an enlarged side view similar to FIG. 5, except that FIG. 6 shows the coaster's safety mechanism retracted.

FIGS. 5 and 6 show studs 114 in extended and retracted positions, respectively. In FIG. 5, the upper portion 117 of bar 116 is in a rearward position which pivots studs 114 downwardly beyond runners 22. A spring 120 (FIG. 3) extends between intermediate lateral strut 28 and upper portion 117 of bar 116 to bias the studs in their extended positions. The studs may be retracted by moving upper bar portion 117 forward as shown in FIG. 6. A flap 122 is mounted by a hinge to forward lateral strut 28. Flap 122 can be moved downwardly to a position between forward lateral strut 28 and upper bar portion 117 to retain upper bar portion 117 in its forward position and to retain studs 114 in their retracted positions.

A cable 126 extends rearwardly from the top of flap 122, through a hole in forward lateral strut 26, around a pulley 130 mounted to intermediate lateral strut 28, and then forward to loop 111 of lever 110. When panel 100 is pressed downward, as shown in FIG. 6, cable 126 is loose enough to allow flap 122 to be moved downwardly to retain studs 114 in their retracted positions. When panel 100 raises, however, such as when a rider falls from coaster 20, cable 126 pulls flap 122 upwardly and releases upper bar portion 117. Because of the tensioning of spring 120, upper bar portion 117 moves rearwardly when released and extends studs 114 as shown in FIG. 5.

In operation, a rider initially lies on the sled, depressing panel 100. He or she then moves upper bar portion 117 forward, and moves flap 122 into a position behind upper bar portion 117 to retain it. This retracts studs 114. If the rider leaves coaster 20, panel 100 raises, raising flap 122 and releasing studs 114 to extend below runners 22 and to stop the coaster.

Figure 11:
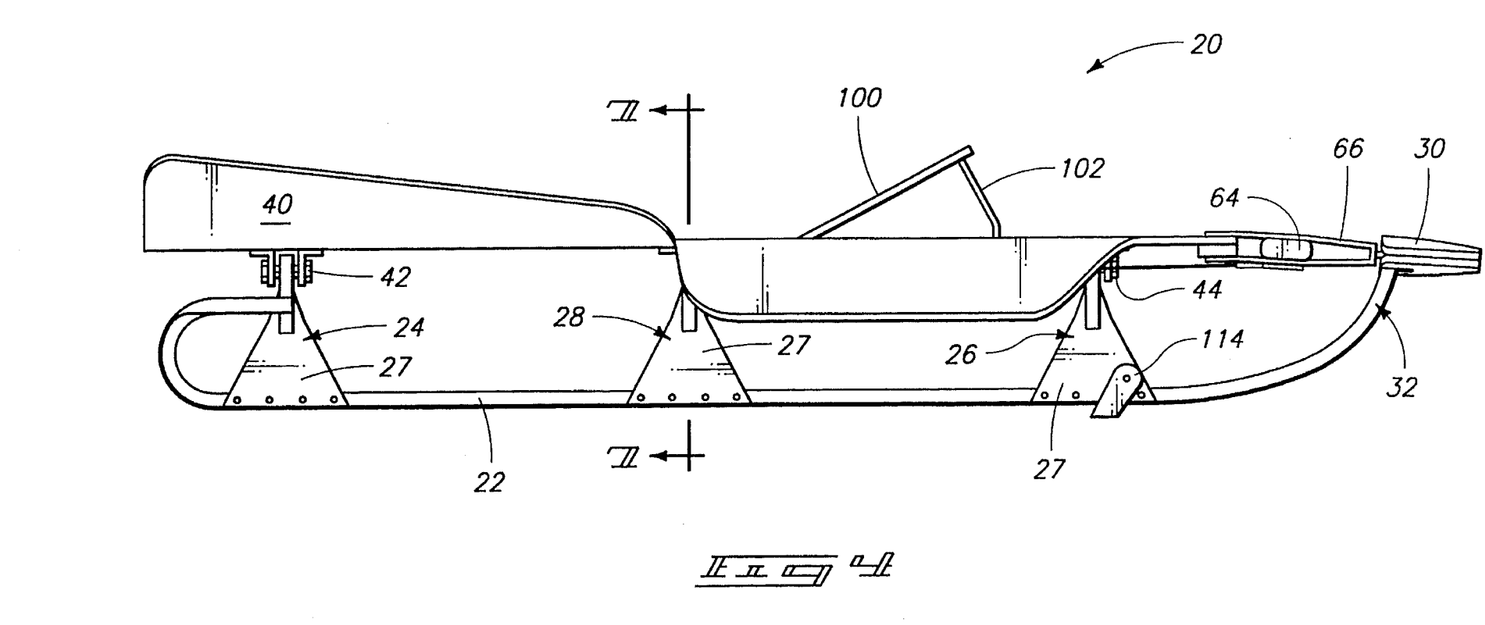
FIG. 11 is a bottom perspective view of a braking element in accordance with the invention.

As shown in the bottom view of FIG. 11, studs 114 have angled blades or ridges 140 on their lower surfaces. The ridges of both studs are angled in the same direction to turn the coaster when the studs are extended. This prevents the coaster from running wild down a coasting hill when the rider is thrown from the sled, in the event that the studs do not create enough braking force to otherwise stop the sled on a steep hill.

Coaster 20 is constructed of conventional materials such as steel and various types of plastics. For example, runners 20 are conventionally formed of steel. Struts 24, 26, and 28 are formed of machined plastic.

A coaster having the features described above allows a rider to achieve higher speeds while still maintaining the ability to negotiate sharp corners. This is accomplished while retaining the traditional construction and characteristics of flexible runner vehicles.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A coaster comprising:
    a pair of longitudinally-extending flexible rail laterally-spaced apart by a plurality of struts, said flexible rails defining a path for the coaster along a ground surface;
    a longitudinally-extending body support board;
    at least one pivot joint joining at least one of said struts and said support board, said pivot joint mounting the body support board along the flexible rails for pivotal movement of the body support board, relative to the flexible rails, about a longitudinal axis;

gearing connected to said body support board and a rack connected to one of said struts, said gearing responsive to pivoting of said body support board, said gearing driving said one of said struts by said rack laterally with respect to said at least one of said struts thereby causing the flexible rails to arc and to thereby curve the path of the coaster.

2. A coaster as recited in claim 1 wherein the gearing between the body support board and the flexible rails comprises:

a toothed rack connected to said one of said struts and extending laterally between the pair of flexible rails; and pinion gearing extending downward from the body support board to mate with the toothed rack, wherein pivoting the body board rotates the pinion gearing and laterally displaces the toothed rack along with an associated segment of the flexible rails.

3. A coaster as recited in claim 1 wherein the flexible rails extend forward to leading rail ends, the coaster further comprising:

a steering handle operably connected to the leading rail ends, said steering handle being turnable about a generally vertical axis to laterally displace the leading rail ends;

interlinkage between the steering handle and the body support board to pivot the body support board and to thereby arc the flexible rails in response to turning the steering handle.

4. A coaster as recited in claim 1 wherein the flexible rails extend forward to leading rail ends, the coaster further comprising:

a steering handle operably connected to the leading rail ends, said steering handle being turnable about a generally vertical axis to laterally displace the leading rail ends;

interlinkage between the steering handle and the body support board to pivot the body support board and to thereby arc the flexible rails in response to turning the steering handle.

said interlinkage comprising cabling operably connected between the steering handle and the pair of flexible rails, said cabling also being coupled to the body support board.

5. A coaster as recited in claim 1 wherein the flexible rails comprise sled runners.

6. A coaster as recited in claim 1 wherein the flexible rails comprise sled runners, the coaster further comprising blades extending downwardly from segments of the runners, said blades having inner edges which are sharpened and outer edges which are rounded.

7. A coaster as recited in claim 1 wherein the body support board has lateral edges and upwardly extending walls along at least rearward portions of said lateral edges.

8. A coaster as recited in claim 1 and further comprising:

a safety release movably mounted with respect to said body support board, said safety release being operated by a rider resting on the body support board, said safety release being movable to an upward position and a downward position relative to said body support board;

at least one braking element operatively connected to the safety release to brake the sled when the safety release is moved to said upward position.

9. A coaster comprising:

a pair of longitudinally-extending and laterally-spaced flexible rails which support and define a path for the coaster along a ground surface;

first, second, and third lateral struts extending between and connected to the flexible rails;

a longitudinally-extending body support board;

pivot joints between the body support board and the lateral struts, said pivot joints mounting the body support board along the flexible rails for pivotal movement of the body support board, relative to the flexible rails, about a longitudinal axis;

gearing connected to the body support board and a rack, said rack connected to said second lateral strut to laterally displace said second lateral strut relative to at least said first and third lateral struts strut in response to pivoting the body support board relative to the flexible rails, such displacement arcing the flexible rails and thereby curving the path of the coaster.

10. A coaster as recited in claim 9 wherein said gearing comprises:

a toothed rack extending laterally along said first lateral strut;

pinion gearing extending from the body support board to mate with the toothed rack, wherein pivoting the body board rotates the pinion gearing and laterally displaces said first lateral strut and an associated segment of the flexible rails.

11. A coaster as recited in claim 9 wherein the flexible rails extend forward from the forward lateral strut to leading rail ends, the coaster further comprising:

a steering handle operably connected to the leading rail ends, said steering handle being turnable about a generally vertical axis to laterally displace the leading rail ends and to thereby further arc the rails;

interlinkage between the steering handle and the body support board to pivot the body support board and laterally displace said first lateral strut in response to turning the steering handle.

12. A coaster as recited in claim 9 wherein the flexible rails extend forward from the forward lateral strut to leading rail ends, the coaster further comprising:

a steering handle operably connected to the leading rail ends, said steering handle being turnable about a generally vertical axis to laterally displace the leading rail ends and to thereby further arc the rails;

interlinkage between the steering handle and the body support board to pivot the body support board and laterally displace said first lateral strut in response to turning the steering handle;

said interlinkage comprising cabling operably connected between the steering handle and the pair of flexible rails, said cabling also being coupled to the body support board.

13. A coaster as recited in claim 9 wherein the flexible rails extend forward from the forward lateral strut to leading rail ends, the coaster further comprising:

a steering handle operably connected to the leading rail ends, said steering handle being turnable about a generally vertical axis to laterally displace the leading rail ends and to thereby further arc the rails;

interlinkage between the steering handle and the body support board to pivot the body support board and laterally displace said first lateral strut in response to turning the steering handle;

said interlinkage comprising cabling operably connected between the steering handle and the pair of flexible rails, said cabling also being coupled to the body support board through one or more pulleys.

14. A coaster as recited in claim 9 wherein the flexible rails comprise sled runners.

15. A coaster as recited in claim 9 wherein the flexible rails comprise sled runners, the coaster further comprising blades extending downwardly from segments of the runners, said blades having inner edges which are sharpened and outer edges which are rounded.

16. A coaster as recited in claim 9 wherein the body support board has lateral edges and upwardly extending walls along at least rearward portions of said lateral edges.

17. A coaster as recited in claim 9 and further comprising:

a safety release movably mounted with respect to said body support board, said safety release being movable to a depressed position from an upward position by a rider's weight when a rider rests on the body support board;

at least one braking element operatively connected to the safety release to extend downwardly beyond the flexible rails to brake the sled when the safety release is in the upward position.

18. A coaster as recited in claim 9 and further comprising:

a safety release movably mounted with respect to said body support board, said safety release being movable to a depressed by a rider's weight when a rider rests on the body support board;

at least one braking element operatively connected to the safety release to extend downwardly beyond the flexible rails to brake the sled when the safety release is in the upward position;

said braking element having a blade for turning the coaster when the braking element is extended downwardly beyond the flexible rails.

19. A coaster comprising:

a pair of longitudinally-extending and laterally-spaced flexible sled runners which support and define a path for the coaster along a ground surface;

forward, intermediate, and rearward lateral struts extending between and connected to the flexible runners;

the flexible sled runners extending forward from the forward lateral strut to leading rail ends;

a longitudinally-extending body support board;

pivot joints between the body support board and the lateral struts, said pivot joints mounting the body support board along the flexible sled runners for pivotal movement of the body support board, relative to the flexible sled runners, about a longitudinal axis;

a steering handle operably connected to a front cross piece, which is connected to the leading rail ends, and connected to the body support board, said steering handle being turnable about a generally vertical axis to laterally displace the leading rail ends and to thereby arc the flexible sled runners;

an additional interlinkage, separate from said steering handle, body support board and said struts, and connected to said steering handle, body support board, and at least one of the struts to pivot the body support board in response to pivoting of the steering handle about said vertical axis;

gearing connected to the body support board and the intermediate lateral strut to laterally displace the intermediate lateral strut relative to the forward and rearward lateral struts in response to pivoting the body support board relative to the flexible sled runners, such displacement further arcing the flexible sled runners and thereby curving the path of the coaster.

20. A coaster as recited in claim 19 wherein said gearing comprises:

a toothed rack extending laterally along said intermediate lateral strut;

pinion gearing extending downward from the body support board to mate with the toothed rack, wherein pivoting the body board rotates the pinion gearing and laterally displaces the intermediate lateral strut and an associated segment of the flexible sled runners.

21. A coaster as recited in claim 19 wherein the interlinkage comprises cabling operably connected between the steering handle and the pair of flexible sled runners, said cabling also being coupled to the body support board.

22. A coaster as recited in claim 19 wherein the interlinkage comprises cabling operably connected between the steering handle and the pair of flexible sled runners, said cabling also being coupled to the body support board through at least one pulley.

23. A coaster as recited in claim 19, the coaster further comprising blades extending downwardly from segments of the flexible sled runners, said blades having inner edges which are sharpened and outer edges which are rounded.

24. A coaster as recited in claim 19 wherein the body support board has lateral edges and upwardly extending walls along at least rearward portions of said lateral edges to hold a rider on the body support board while cornering the coaster.

25. A coaster as recited in claim 19 and further comprising:

a safety release movably mounted with respect to said body support board, said safety release being movable to a depressed position from an upward position by a rider's weight when a rider rests on the body support board;

at least one braking element operatively connected to the safety release to extend downwardly beyond the flexible sled runners to brake the sled when the safety release is in the upward position.

26. A coaster as recited in claim 19 and further comprising:

a safety movably mounted with respect to said body support board, said safety release being movable to a depressed position from an upward position by a rider's weight when a rider rests on the body support board;

at least one braking element operatively connected to the safety release to extend downwardly beyond the flexible sled runners to brake the sled when the safety release is in the upward position;

said braking element having a blade for turning the coaster when the braking element is extended downwardly beyond the flexible sled runners.

27. A coaster comprising:

A pair of longitudinally-extending flexible rails laterally-spaced apart by and connected to at least three struts, said struts laterally disposed so as to have two end struts and a laterally displaceable center strut, said flexible rails defining a path for the coaster along a ground surface;

a front cross piece, said front cross piece disposed between and connected to said rails at a first end of said coaster;

a longitudinally-extending body support board;

pivot joints joining said struts and said support board, said pivot joints mounting the body support board along the flexible rails for pivotal movement of the body support board, relative to the flexible rails, about a longitudinal axis;

a mechanism to displace the center strut connected to said body board and said center strut for laterally displacing said center strut in response to pivoting of said body board, thereby causing the flexible rails and said longitudinal axis to arc; and wherein each said end strut is connected to said pivot joints to allow said end struts to pivot about a vertical axis extending through each said end strut and said pivot joint to allow the flexible rails to arc, thereby causing the path of the coaster to curve.

\* \* \* \* \*